United States Patent
Tanimoto

(10) Patent No.: US 7,167,981 B2
(45) Date of Patent: Jan. 23, 2007

(54) METHOD OF TRANSMITTING EMAIL, DEVICE FOR IMPLEMENTING SAME METHOD, AND STORING MEDIUM STORING PROGRAM FOR TRANSMITTING EMAIL

(75) Inventor: Yoshifumi Tanimoto, Uji (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 901 days.

(21) Appl. No.: 10/057,111

(22) Filed: Jan. 23, 2002

(65) Prior Publication Data

US 2002/0097877 A1    Jul. 25, 2002

(30) Foreign Application Priority Data

Jan. 25, 2001   (JP) ............................. 2001-017517

(51) Int. Cl.
- H04L 9/00 (2006.01)
- H04K 1/00 (2006.01)
- G06F 15/16 (2006.01)

(52) U.S. Cl. ...................... 713/163; 713/160; 380/259; 709/206

(58) Field of Classification Search ...................... None
See application file for complete search history.

(56) References Cited

U.S. PATENT DOCUMENTS

| | | | |
|---|---|---|---|
| 6,253,322 B1 * | 6/2001 | Susaki et al. | 713/170 |
| 6,256,733 B1 * | 7/2001 | Thakkar et al. | 713/156 |
| 6,260,142 B1 * | 7/2001 | Thakkar et al. | 713/158 |
| 6,266,420 B1 * | 7/2001 | Langford et al. | 380/282 |
| 6,363,154 B1 * | 3/2002 | Peyravian et al. | 380/283 |
| 6,912,656 B1 * | 6/2005 | Perlman et al. | 713/170 |
| 2001/0009583 A1 * | 7/2001 | Murakami | 380/278 |
| 2001/0014156 A1 * | 8/2001 | Murakami | 380/277 |
| 2002/0007453 A1 * | 1/2002 | Nemovicher | 713/155 |
| 2002/0076053 A1 * | 6/2002 | Hachimura | 380/277 |
| 2002/0099941 A1 * | 7/2002 | Tanimoto | 713/168 |
| 2003/0021416 A1 * | 1/2003 | Brown et al. | 380/277 |

FOREIGN PATENT DOCUMENTS

JP          05-327748          12/1993

(Continued)

OTHER PUBLICATIONS

Hefert, "Security-Enhanced Mailing Lists", May/Jun. 1997, IEEE Network, p. 30-33.*

(Continued)

Primary Examiner—Christopher Revak
(74) Attorney, Agent, or Firm—Hogan & Hartson LLP

(57) ABSTRACT

A method of transmitting email and a device for transmitting email capable of broadcasting the email including encrypted data effectively. When a personal computer PC1 accepts an instruction to transmit same data to multiple destinations by email, the PC1 generates a session key (S105) and encrypts the data by utilizing the generated session key (S106). Next, the PC1 generates the common key by utilizing a public key generated based on an email address of each destination and the secret key acquired from a center in advance (S107), and encrypts the session key by utilizing the generated common key (S108). The PC1 transmits the email including the encrypted data and the encrypted session key to each destination (S110).

16 Claims, 6 Drawing Sheets

FOREIGN PATENT DOCUMENTS

WO 2004/100496 A2 * 11/2004

OTHER PUBLICATIONS

Sakakibara et al, "The ID-based Non-interactive Group Communication Key Sharing Scheme Using Smart Cards", 1994, IEEE, p. 91-98.*

Muakami et al, "A New Probablistic ID-Based Non-interactive Key Sharing Scheme", Jan. 2000, IEICE Trans. Fundamentals, vol. E83-A, No. 1, p. 2-9.*

Hanaoka et al, "A Hierarchical Non-interactive Key-Sharing Scheme with Low Memory Size and High Resistance against Collusion Attacks", 2002, British Computing Society, The Computer Journal, vol. 45, No. 3, p. 293-303.*

* cited by examiner

METHOD OF TRANSMITTING EMAIL, DEVICE FOR IMPLEMENTING SAME METHOD, AND STORING MEDIUM STORING PROGRAM FOR TRANSMITTING EMAIL

CROSS REFERENCES TO RELATED APPLICATIONS

This application claims priority under 35 USC 119 of Japanese Patent Application No. 2001-17517 filed in JPO on Jan. 25, 2001, the entire disclosure of which is incorporated herein by reference.

BACKGROUND OF THE INVENTION

1. Field of the Invention

The present invention relates to an email transmission method of broadcasting email including encrypted data, and relates to an email transmission device for implementing the method.

2. Description of the Related Art

In recent years, various cryptograph techniques have been carefully watched for realizing safe data communication in connection with the rapid growth of the computer network. So far, the common key cryptosystem in which an encryption key is equal to a decryption key and the public key cryptosystem in which both keys are different are widely used. Data Encryption Standards (DES) adopted by National Institute of Standards and Technology is a typical example of the common key cryptosystem, and Rivest Shamir Adleman (RSA) is a typical example of the public key cryptosystem.

The cryptosystem, which utilizes the ID (Identity) information identifying an individual such as the address, the name and the email address of each user, is also being proposed these days. In this cryptosystem, the common encryption key is generated between a sender and a receiver based on the ID information.

ID-NIKS (ID-based Non-Interactive Key Sharing Scheme) is being studied and proposed as the cryptosystem which is based on the ID information stated above and does not need the preliminary communication between a sender and a receiver prior to the cryptographic communication (that is, communication of encrypted data). Since the ID-NIKS does not need to exchange a public key and a secret key between a sender and a receiver and there is no need of the key list and the service by the third party, the communication can be established safely between any users. Furthermore, since there is no need to carry out the preliminary communication as mentioned above, there is an advantage of being convenient for users, so that this cryptosystem is expected to be a core of a cryptosystem in the future.

FIG. 6 is an explanatory drawing showing the principle of the ID-NIKS system. Assuming that there is a reliable center, the common key generating system is composed by centering this center. In FIG. 6, the ID information of an entity A is designated as the reference mark h (IDA) utilizing the hash function h (.). Regarding any entity A, the center calculates a secret key SAi based on a center public information {PCi}, a center secret information {SCi}, and the ID information h(IDA) of the entity A by the equation: SAi=Fi ({SCi}, {PCi}, h(IDA)), and distributes it to the entity A.

Utilizing the secret key {SAi} of the entity A itself, the center public information {PCi} and the ID information h(IDB) of the entity B, the entity A generates a common key KAB by the equation: KAB=f({SAi}, {PCi}, h(IDB)) for encrypting and decrypting the communication established with the other optional entity B.

Moreover, in the same manner, the entity B also generates the common key KBA used between the entities A and B. If the relation that KAB is equal to KBA is constantly established, the common keys KAB, KBA can be utilized as the encryption key and the decryption key between the entities A and B.

The case of sending and receiving email utilizing the aforementioned ID-NIKS will be described. First, a sender and a receiver of email respectively acquire the secret key set based on their own email addresses (the ID information) from the center in advance. The sender generates the common key in accordance with the public key generated based on the receiver's email address (the ID information) and in accordance with the secret key acquired as described above, the data is encrypted utilizing the generated common key, and the encrypted data is sent by email. On the other hand, the receiver generates the common key in accordance with the public key generated based on the sender's email address (the ID information) and in accordance with the secret key acquired as mentioned above, and decrypts data in the received email by utilizing the common key generated as mentioned above.

In this manner, the safe sending and receiving of email can be realized easily. Additionally, the above DES etc. can be utilized in the cryptographic communication based on such ID-NIKS, for example.

When transmitting same data to a plurality of destinations by email, so-called broadcasting can be utilized. The term "broadcasting" here means the transmission method by which email can be sent to respective designated destinations by sending email having a plurality of the designated destinations only once. If such broadcasting is utilized, there is an advantage that it needs less communication volume compared with the case of sending email to the respective destinations many times.

However, when utilizing ID-NIKS, even if same data is sent to multiple destinations by email, the data must be encrypted utilizing the respective email addresses of destinations as mentioned above, and the different email must be sent to each of the destinations. Therefore, there is a problem that we cannot accomplish the advantage of the multiple-address transmission as mentioned above.

Moreover, we can not only accomplish such a advantage, but there is also a problem that it sometimes puts an enormous burden on the transmission process since the encryption process of the sending data must be executed a plurality of times as many as the number of the designated destinations.

In the meantime, as for the data communication in a computer network, a method by which data is transmitted after encrypting the data by utilizing the specified session key has been adopted in order to secure the sending data. The dishonesty such as interpolating and pretending can be prevented in advance by utilizing such a session key.

SUMMARY OF THE INVENTION

The present invention was made in view of the existence of such a session key. It is an object of the present invention to provide the email transmission method and the email transmission device for implementing this method. With this method and device, even if the email including the encrypted data is transmitted to multiple destinations, the burden of transmission process is reduced compared with the conventional method since the only one encryption process of the transmission data is enough for sending email including the encrypted data. This is accomplished by a manner in which the data is encrypted by utilizing the session key, the session key is encrypted by using the common keys which are each designated to respective destinations, and then the email including the encrypted data and session key is transmitted.

It is another object of the present invention to provide the email transmission method by which a receiver can easily know that received email is transmitted to multiple addresses (broadcasted) by sending the email including the header information showing multiple transmission destinations as well as the encrypted data and the encrypted session key.

According to a first aspect of the present invention, there is provided an email transmission method of transmitting the same data to a plurality of destinations by which the data is encrypted utilizing the session key, the session key is encrypted utilizing the respective common keys determined to respective destinations, and the email including the encrypted data and the encrypted session key is transmitted.

According to a second aspect of the present invention, there is provided an email transmission method by which the email including the encrypted data, the encrypted session key and the header information showing the multiple destinations is transmitted.

According to a third aspect of the present invention, there is provided an email transmission method by which the email including the encrypted data and one encrypted session key to the destination related to the common key which was used for encrypting the session key.

According to a forth aspect of the present invention, there is provided an email transmission method by which the email including the encrypted data and all the encrypted session keys is transmitted to each of the multiple destinations.

According to a fifth aspect of the present invention, there is provided an email transmission device including means for encrypting the data by utilizing the session key, means for encrypting the session key by utilizing the respective common keys determined to the respective destinations, and means for transmitting the email including the encrypted data and the encrypted session key to multiple destinations.

According to the first and fifth aspects of the present invention, the data to be transmitted to the multiple destinations is encrypted by utilizing the session key, and the session key is also encrypted by utilizing the common key determined to each of the destinations. After that, the email including the encrypted data and the encrypted session key is sent.

In this manner, only one encryption process of the data to be transmitted is enough for sending email to the multiple destinations, so that the time required for the encrypting process can be reduced compared with the conventional case in which the encrypting process must be carried out the number of times which is equal to the number of the destinations, and the burden on the process for sending email can be relieved.

According to the second aspect of the present invention, the email including the header information showing the multiple destinations is transmitted together with the encrypted data and session key, so that a receiver can easily know that the email was transmitted to the multiple addresses.

According to the third aspect of the present invention, the email including one session key out of the encrypted session keys is sent to the destination related to the common key which was used for encrypting this session key.

As in this manner, when the email including one encrypted session key is sent to the destination related to the common key which was used for encrypting this session key, the receiver receives only the session key which can be decrypted by utilizing the receiver's own common key, and receives only the data which can be decrypted by utilizing this session key, so that the user can confirms the contents of the email by decrypting the data easily.

According to the fourth aspect of the present invention, the email including all of the encrypted session keys is sent to the respective destinations together with the encrypted data.

In this manner, when sending same email to multiple destinations, only one transmission operation of the email is enough as in the case of the ordinary broadcasting, so that the communication volume becomes lower compared with the case of respectively sending email to each destination.

Additional objects, aspects, benefits and advantages of the present invention will become apparent to those skilled in the art to which the present invention pertains from the subsequent detailed description and the appended claims, taken in conjunction with the accompanying drawings.

BREIF DESCRIPTION OF THE DRAWINGS

DETAILED DESCRIPTION OF THE INVENTION

The present invention will be described below with reference to the drawings showing embodiments of the invention. Additionally, the framework of ID-NIKS is utilized as the common key system as mentioned later.

1. First Embodiment

Figure 1:
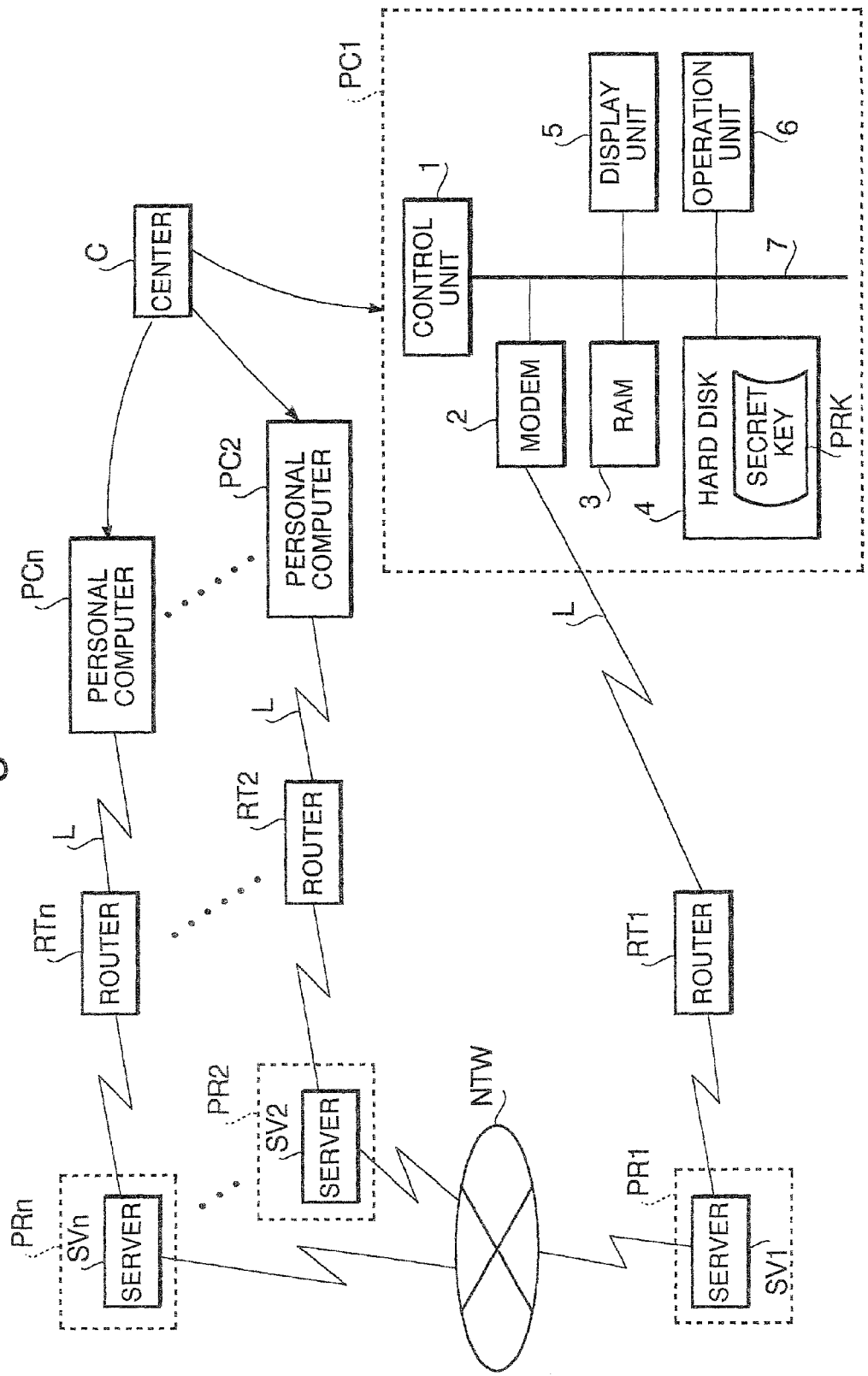
FIG. 1 is a block diagram showing a constitutional example of personal computers functioning as email transmission devices according to embodiments of the present invention and a computer network connected to the personal computers.

In FIG. 1, NTW designates the Internet that is a computer network, and the numerous providers (Internet Service Providers) PR1, PR2, . . . , PRn (n: natural number) are connected to this Internet NTW.

The providers PR1, PR2, . . . , PRn respectively have the servers SV1, SV2, . . . , SVn (n: natural number) functioning as email servers providing transmission and reception service of email to their clients who contracted with them.

Moreover, the personal computers PC1, PC2, ..., PCn as the clients are connected to the servers SV1, SV2, ..., SVn of the providers PR1, PR2, ..., PRn via the routers RT1, RT2, ..., RTn (n: natural number).

The respective personal computers PC1, PC2, ..., PCn, having email transmission and reception functions, comprise a control unit 1, a modem 2, a hard disk 4, a display unit 5 and a operation unit 6, etc. The transmission and reception of email by these computers may be carried out by utilizing SMTP (Simple Mail Transfer Protocol) and POP3 (Post Office Protocol 3), The control unit 1 comprises a CPU and the cache memory etc., controls each of hardware units which are connected to the control unit via a bus 7, and executes various computer programs stored in the hard disk 4 as mentioned later.

The modem 2, which is a communication interface for establishing data communication via the Internet NTW, carries out operation of closing to or releasing from an analogue circuit L. Furthermore, the modem 2 may be replaced with a DSU (Digital Service Unit) so as to connect the PC1 to a digital line of a baseband method.

The RAM 3 comprises a SRAM or a DRAM etc., and stores the temporary data generated in the control unit 1.

The hard disk 4 comprises the writable and readable magnetic disk, and stores various computer programs necessary for the operation of the personal computers PC1, PC2, ..., PCn in advance.

This hard disk 4 also stores a secret key (or a private key) issued by a center C. As illustrated in FIG. 1, the hard disk 4 provided in the personal computer PC1 stores the secret key PRK1 generated based on the email address possessed by a user using the personal computer PC1, and the hard disks 4 provided in the personal computers PC2, ..., PCn stores the secret keys PRK2, ..., PRKn produced respectively in the same manner.

In addition, there are various methods of acquiring the secret keys PRK1, PRK2, ..., PRKn secretly from the center C. For example, the secret keys can be acquired via a communication network such as the Internet NTW, and the secret keys can be also acquired by storing the secret keys PRK1, PRK2, ..., PRKn in the flexible disk and receiving the flexible disk by mail, etc.

The display unit 4, which is the display device such as a CRT display or a liquid crystal display (LCD) etc., displays the operational condition of the personal computers PC1, PC2, ..., PCn and the various input or output data.

The operation unit 6 is an input device such as the keyboard necessary for operating the personal computers PC1, PC2, ..., PCn.

Next, the operation of the personal computers PC1, PC2, ..., PCn according to the first embodiment will be described. Additionally, it is assumed that the personal computer PC1 has concluded log-in by transmitting the user ID or the password to the provider PR1 with which the user has contracted. In addition to that, it is assumed that the user is going to send email of the same contents to multiple destinations.

Figure 2:
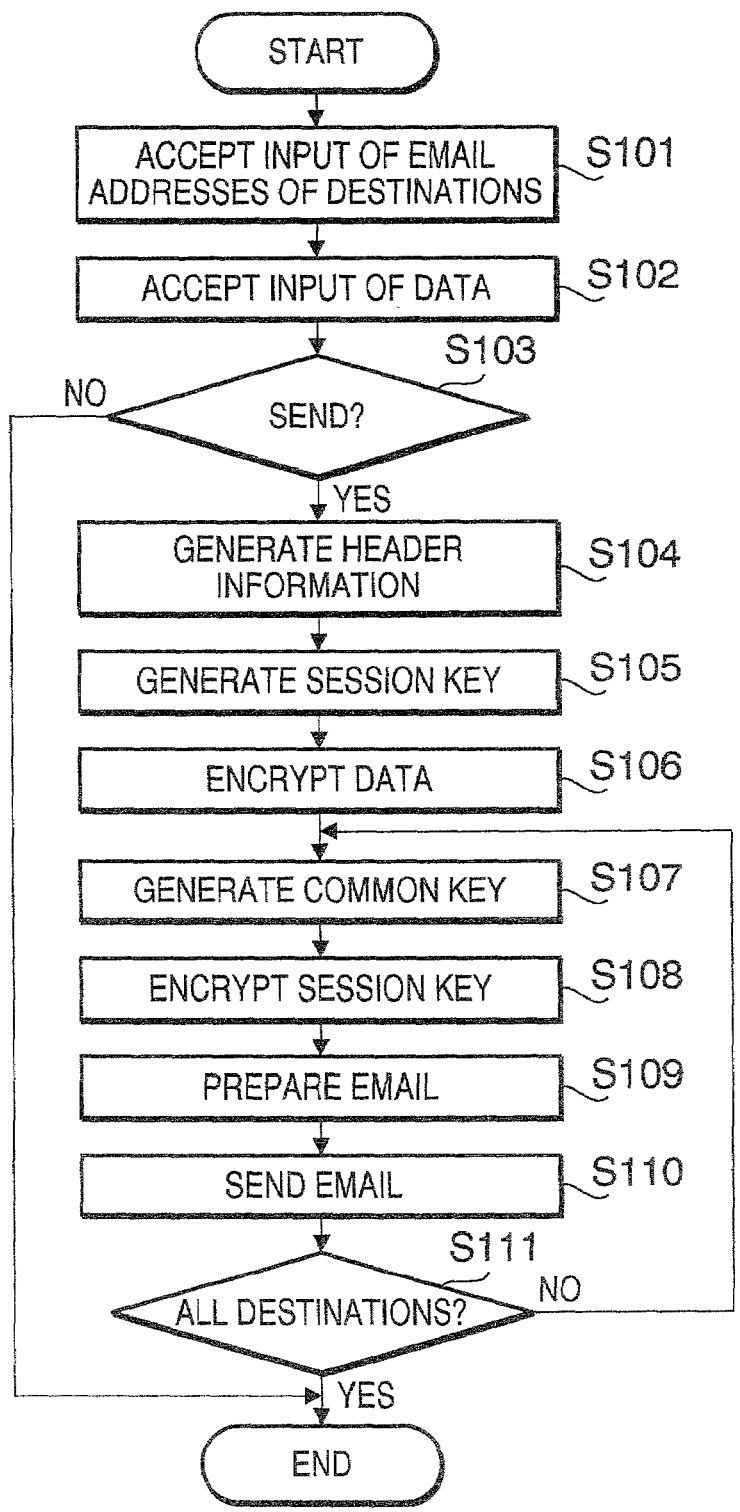
FIG. 2 is a flow chart showing a process procedure of the control unit in a case in which the personal computer according to a first embodiment of the present invention transmits email.

As shown in FIG. 2, first, the control unit 1 accepts the email addresses input by the user operating the operation unit 6, and the data targeted for transmitting as email (S101, S102). Additionally, as mentioned above, a plurality of email addresses are accepted in the step S101 as the user is going to transmit email to multiple destinations.

Next, the control unit 1 judges whether or not the order to transmit email is accepted via the operation unit 6 by the user (S103). If the order to cancel the transmission is accepted or if the order instruction to transmit the email is not accepted within a prescribed period, the control unit 1 judges that the order instruction to transmit the email is not accepted (NO in S103), and the process is terminated.

On the other hand, if the control unit 1 judges that the order instruction to transmit the email is accepted in the step S103 (YES in S103), the header information including a plurality of email addresses accepted in the step S101 is generated (S104).

Next, a session key for encrypting the data to be transmitted is generated (S105). Furthermore, instead of generating the new session key every time as this manner, a prescribed number of session keys may be prepared in advance and may be used repeatedly.

Next, the transmission data accepted in the step S102 is encrypted utilizing the session key generated in the step S105 (S106). DES (Data Encryption Standard) may be used as the encryption system.

Moreover, one email address of a plurality of the email addresses accepted in the step S101 is read in, and the common key is generated by utilizing the public key generated based on the email address and the secret key PRK1 stored in the hard disk 4 (S107). The common key may be generated by utilizing ID-NIKS.

Next, the session key generated in the step S105 is encrypted by utilizing the common key generated in this manner (S108). The session key may be encrypted by DES. The read-in email address is set as a destination, and the email is prepared by utilizing the session key encrypted in the step S108 and the data encrypted in the step S106 (S109).

Figure 3:
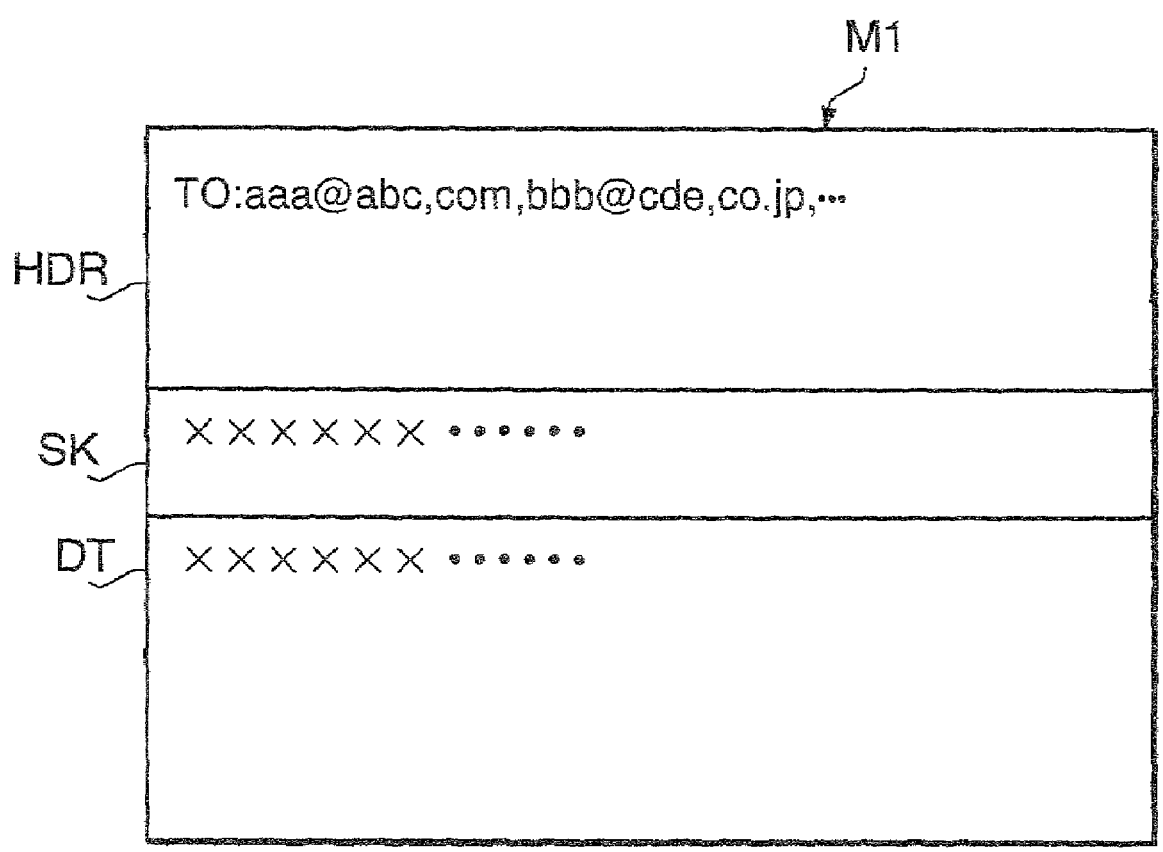
FIG. 3 is a schematic diagram showing a constitutional example of email prepared by the control unit of the personal computer according to the first embodiment of the present invention;.
Figure 4:
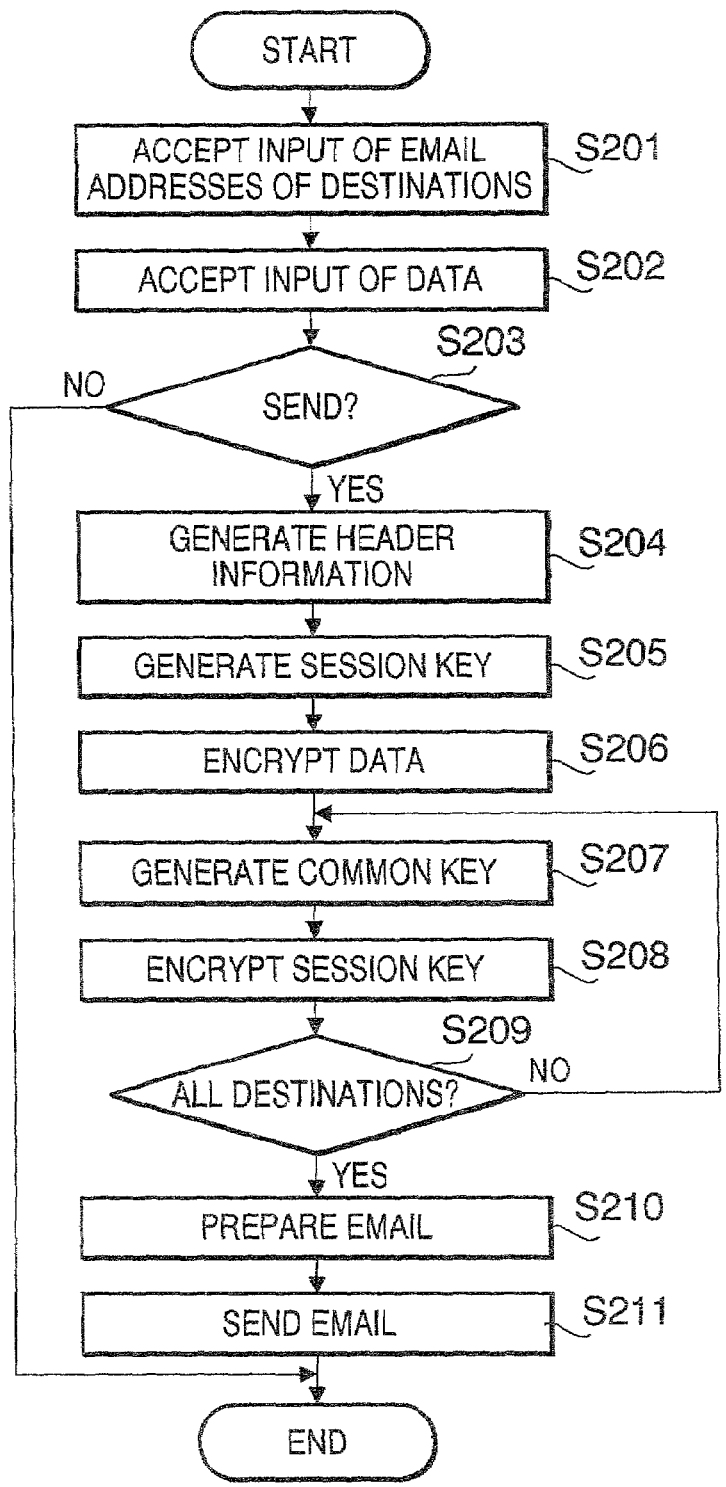
FIG. 4 is a flow chart showing a process procedure of the control unit in a case in which the personal computer according to a second embodiment of the present invention transmits email.

As illustrated in FIG. 3, an email M1 prepared in the step S109 includes a header part HDR, a session key part SK and a data part DT.

The header information prepared in the step S104 is stored in the header part HDR. As this header information includes a plurality of the email addresses that are destinations as mentioned above, receivers can easily confirm that the received email has been broadcasted with reference to this header information.

Moreover, the session key encrypted in the step S108 is stored in the session key part SK and the data encrypted in the step S106 is stored in the data part DT.

The control unit 1 prepares the email M1 in the step S109 and then sends the prepared email M1 (S110). Next, the control unit 1 judges whether or not the email M1 has been transmitted to all of a plurality of the email addresses accepted in the step S101, namely whether or not the email M1 has been transmitted to all destinations (S111). If the control unit 1 judges that there is an address to which the email M1 has not been transmitted yet (S111: NO), the steps from S107 to S110 are repeated until the email M1 is transmitted to all destinations. The process is terminated if the control unit 1 judges that the email M1 has been transmitted to all of the destinations (S11: YES).

The email M1 transmitted from the personal computer PC1 as described above is received by the personal computers PC2, ..., PCn via the server SV1 and the server SV2, ..., SVn etc. The personal computers PC2, ..., PCn which received the email M1 generate the common keys respectively by utilizing the public key generated based on the sender's email address and the secret keys PRK2, ..., PRKn stored in the hard disk 4, and decrypt the encrypted session key by utilizing the generated common key. Furthermore, the common keys may be generated by utilizing ID-NIKS. This encrypted session key is stored in the session key part SK of the received email M1. Moreover, the data stored in the data part DT is decrypted utilizing the decrypted session key, so that each user can confirm the contents of the email M1.

Only one encryption process of the transmission data is enough even in the case of transmitting the email M1 to multiple destinations by utilizing the session key in this manner. Therefore, the time necessary for carrying out the encryption process can be shorten compared with the case in which the number of how many times encryption process is required to be carried out is as much as the number of destinations, and the burden on the transmission process of the email M1 can be relieved.

Moreover, the safe transmission and reception of email can be realized easily by utilizing the framework of ID-NIKS as the common key system.

2. Second Embodiment

As mentioned above, since the personal computers PC1, PC2, ..., PCn in the embodiment 1 respectively transmit the email including the encrypted data to a plurality of email addresses that are transmission destinations of email, the transmission process of email is needed to be executed several or many times. On the other hand, only one transmission process of email is enough in case of the personal computers PC1, PC2, ..., PCn according to a second embodiment as mentioned later.

The composition of the personal computers PC1, PC2, ..., PCn and the constitutional example of these personal computers PC1, PC2, ..., PCn and the computer network in the second embodiment is the same as that in the embodiment 1, so that the illustration and description of them in the second embodiment will be omitted.

The operation of the personal computer PC1 according to the embodiment 2 will be described below. In the same manner as the case of the first embodiment, it is assumed that the personal computer PC1 has concluded log-in to the provider PR1 and a user is going to transmit email of the same contents to multiple destinations.

First, an user operates the operation unit 6 to input email addresses of multiple destinations and data to be transmitted as email, and thereby the control unit 1 accepts the inputted email addresses and data (S201, S202).

Next, the control unit 1 judges whether or not the order instruction to transmit the email is accepted from the user via the operation unit 6 (S203). If the order to cancel the transmission is accepted or if the order instruction to transmit the email is not accepted within a prescribed period, the control unit 1 judges that the order instruction to transmit the email has not been accepted (NO in S203), and the process is terminated.

On the other hand, if the control unit 1 judges that the order instruction to transmit the email has been accepted in the step S203 (YES in S203), the header information including a plurality of the email addresses accepted in the step S201 is generated (S204).

Next, a session key for encrypting the transmission data is generated (S205). Instead of generating the new session key every time as this manner, a prescribed number of session keys may be prepared in advance and may be used repeatedly.

Next, the data to be transmitted which has been accepted in the step S202 is encrypted by utilizing the session key generated in the step S205 (S206). The data may be encrypted by DES.

One email address out of a plurality of the email addresses accepted in the step S201 is read in and the common key is generated by utilizing the public key generated based on the email address and the secret key PRK1 stored in the hard disk 4 (S207). The common key may be generated by ID-NIKS.

Next, the session key generated in the step S205 is encrypted by utilizing the common key generated in this manner (S208). The session key may be encrypted by DES. Next, the control unit 1 judges that whether or not the common key has been generated by utilizing all of the email addresses related to the destinations which are accepted in the step S201 (S209). If the control unit 1 judges that there is an email address which has not been utilized for producing the common key (NO in S209), the steps S207 and S208 are repeated until all of the email addresses related to the destinations are utilized.

If the control unit 1 judges that the common key has been generated utilizing the all email addresses related to the destinations (YES in S209), the all email addresses accepted in the step S201 are set as the transmission destinations, and email is prepared by utilizing a plurality of the encrypted session keys generated by repeating the step S208 and the data encrypted in the step S206 (S210).

Figure 5:
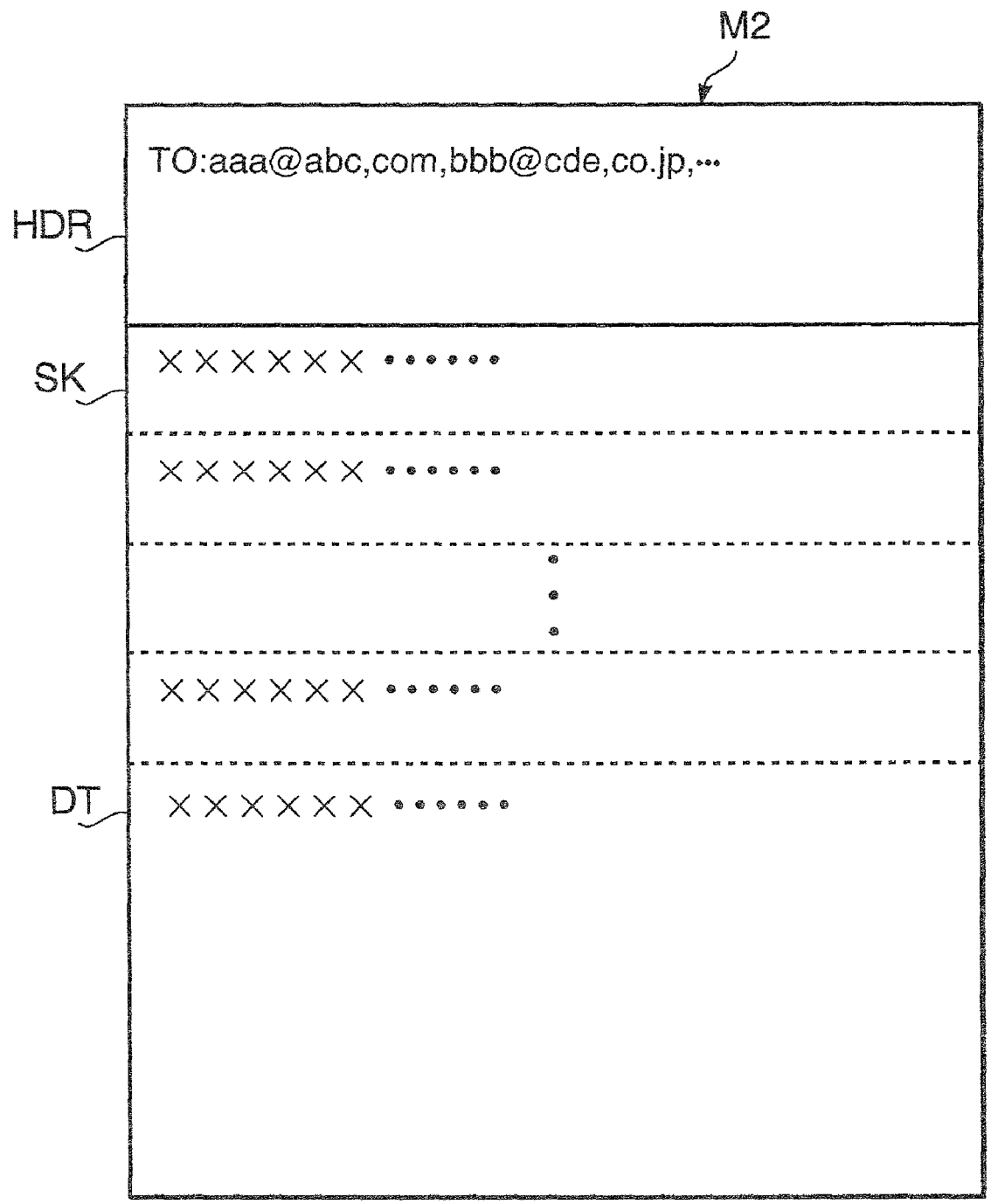
FIG. 5 is a schematic diagram showing a constitutional example of email prepared by the control unit of the personal computer according to the second embodiment of the present invention.
Figure 6:
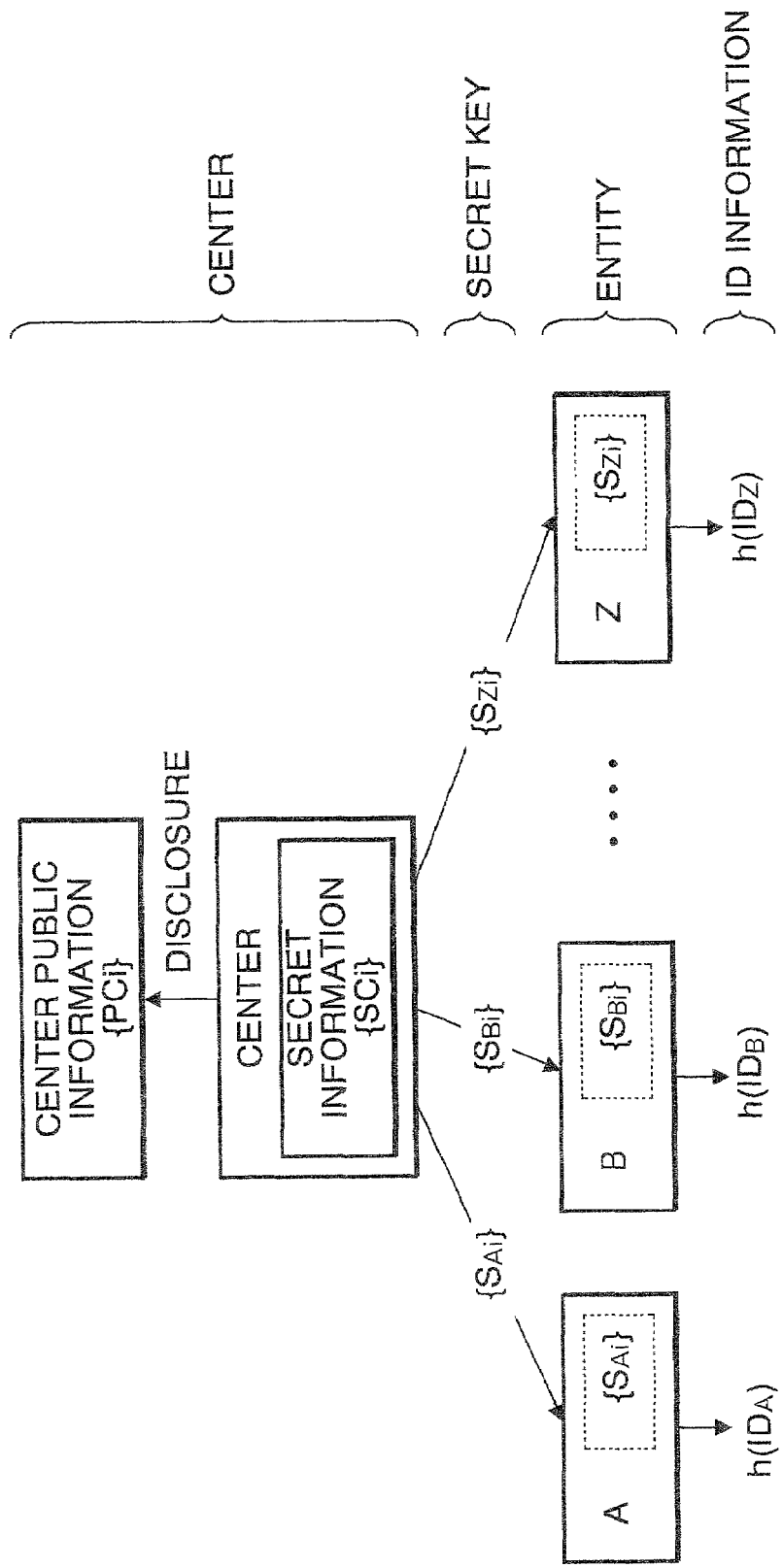
FIG. 6 is an explanatory drawing showing the principle of a ID-NIKS system.

As illustrated in FIG. 5, the email M2 prepared in the step S210 includes a header part HDR, a session key part SK and a data part DT as in the case of the email M1 in the first embodiment. In case of the email M1 in the first embodiment, the encrypted session key related to one destination is stored in the session key part SK. However, in case of the email M2, the encrypted session keys related to all of the destinations are stored in the session key part SK.

After the email M2 including the above parts is prepared in the step S210, the control unit 1 causes transmission of the prepared email (S211), and the process is terminated.

The email M2 transmitted from the personal computer PC1 as mentioned above is received by the personal computers PC2, ..., PCn via the server SV1 and the server SV2, ..., SVn, etc. The personal computers PC2, ..., PCn which received the email M2 generate the common keys respectively by utilizing the public key generated based on the sender's email address and the secret keys PRK2, ..., PRKn stored in the hard disk 4, and try to decrypt a plurality of the encrypted session keys stored in the session key part SK of the received email M2 by utilizing the generated common keys. The common keys may be generated by ID-NIKS. Therefore, the data stored in the data part DT is decrypted utilizing the session key which has been decrypted, so that each user can confirm the contents of the email M2.

When the email M2 including the encrypted session keys related to all destinations is prepared, only one transmission process of the email M2 to the server SV1 results in the email which has been transmitted to multiple destinations as in the case of the normal broadcasting. Therefore, the communication volume becomes less compared with the case of transmitting email to the respective destinations several or many times.

Furthermore, the safe transmission and reception of email can be realized easily by utilizing the framework of ID-NIKS as the shared key system as in the case of the first embodiment.

What is claimed is:

1. A method of transmitting same data to a plurality of destinations by email, comprising the steps of:
   (a) encrypting data by utilizing a session key;
   (b) encrypting the session key by utilizing each of common keys which have been determined to the respective destinations, wherein each common key is generated by an ID-based Non-Interactive Key Sharing Scheme utilizing a public key based on a receiver's email address and a secret key based on a sender's email address; and (c) transmitting email including the encrypted data and the encrypted session key.

2. The method according to claim 1, wherein in the step (c), the email including header information showing the plurality of the destinations as well as the encrypted data and the encrypted session key is transmitted.

3. The method according to claim 1, wherein in the step (c), the email including the encrypted data and the one encrypted session key is transmitted to a destination related to the common key which has been utilized to encrypt the one session key.

4. The method according to claim 1, wherein in the step (b), before transmitting the email, the session key is repeatedly encrypted until all of the common keys which have been determined to the respective destinations are utilized to encrypt the session key, and wherein in the step (c), the email including the encrypted data and all of the encrypted session keys is transmitted to all of the destinations by one transmission process.

5. The method according to claim 1, wherein until all of the common keys which have been determined to the respective destinations are utilized to encrypt the session key, steps (b) and (c) are repeated such that after transmitting the email, the session key is encrypted by another common key, and then another email including the encrypted data and the session key encrypted by the another common key is transmitted.

6. The method according to claim 1, wherein the data and the session key are encrypted by Data Encryption Standard.

7. A device for transmitting email comprising:

first means for encrypting data by utilizing a session key;

second means for encrypting the session key by utilizing each of common keys which have been determined to the respective destinations, wherein each common key is generated by an ID-based Non-Interactive Key Sharing Scheme utilizing a public key based on a receiver's email address and a secret key based on a sender's email address and stored locally on a storing w.eans of the device; and third means for transmitting email including the encrypted data and the encrypted session key.

8. The device for transmitting email according to claim 7, wherein third means transmits the email including header information showing the plurality of the destinations as well as the encrypted data and the encrypted session key.

9. The device for transmitting email according to claim 7, wherein the third means transmits the email including the encrypted data and the one encrypted session key to a destination related to the common key which has been utilized to encrypt the one session key.

10. The device for transmitting email according to claim 7, wherein before the third means transmits the email, the second means encrypts the session key repeatedly until all of the common keys which have been determined to the respective destinations are utilized to encrypt the session key, and wherein the third means transmits the email including the encrypted data and all of the encrypted session keys to all of the destinations by one transmission process.

11. The device for transmitting email according to claim 7, wherein until all of the common keys which have been determined to the respective destinations are utilized to encrypt the session key, the second means and the third means repeat encryption of the session key and transmission of the email respectively such that after transmitting the email, the session key is encrypted by another common key, and then another email including the encrypted data and the session key encrypted by the another common key is transmitted.

12. A storing medium storing a program for causing a computer to transmit same data to a plurality of destinations, wherein the program includes:

first program code means for causing a computer to encrypt data by utilizing a session key;

second program code means for causing the computer to encrypt the session key by utilizing each of common keys which have been determined to the respective destinations, wherein each common key is generated by an ID-based Non-Interactive Key Sharing Scheme utilizing a public key based on a receiver's email address and a secret key based on a sender's email address and stored on the storing medium; and third program code means for causing the computer to transmit email including the encrypted data and the encrypted session key.

13. The storing medium according to claim 12, wherein third program code means causes the computer to transmit the email including header information showing the plurality of the destinations as well as the encrypted data and the encrypted session key.

14. The storing medium according to claim 12, wherein the third program code means causes the computer to transmit the email including the encrypted data and the one encrypted session key to a destination related to the common key which has been utilized to encrypt the one session key.

15. The storing medium according to claim 12, wherein before the third program code means causes the computer to transmit the email, the second program code means causes the computer to encrypt the session key repeatedly until all of the common keys which have been determined to the respective destinations are utilized to encrypt the session key, and wherein the third program code means causes the computer to transmit the email including the encrypted data and all of the encrypted session keys to all of the destinations by one transmission process.

16. The storing medium according to claim 12, wherein until all of the common keys are utilized to encrypt the session key, the second program code means and the third program code means causes the computer to repeat encryption of the session key and transmission of the email respectively such that after transmission of the email, the session key is encrypted by another common key, and then another email including the encrypted data and the session key encrypted by the another common key is transmitted.

* * * * *